United States Patent Office.

EZRA BLAKELEY, OF NEPONSET, ILLINOIS, ASSIGNOR FOR ONE-HALF TO PETER PIERSON, OF SAME PLACE.

Letters Patent No. 100,588, dated March 8, 1870.

IMPROVED PAINT COMPOUND.

The Schedule referred to in these Letters Patent and making part of the same.

To all whom it may concern:

Be it known that I, EZRA BLAKELEY, of Neponset, in the county of Bureau, and State of Illinois, have invented a Combination of certain Ingredients Constituting Paint; and I hereby declare the following to be a full and exact description thereof.

I combine the following ingredients in the proportions given, viz: Lime, six quarts; salt, two quarts; alum, one pound; sulphate of copper, one-half pound; sulphate of zinc, two pounds; water, twenty-five gallons.

Add to the above a sufficient quantity of water-lime to render the mass of such consistency as will flow readily and properly from a brush.

Any shade or color may be imparted to the above by the addition of the requisite coloring materials.

My improved compound renders brick sufficiently impervious to water as to prevent brick walls from peeling off or crumbling on the outside by becoming frozen. It hardens soft brick and increases their durability. It renders the mortar less absorbent of water, and prevents it from crumbling or "heaving out;" is cheaper, and can be applied to brick walls more readily and with less labor than oil-paint, and preserves its color equally as well as the best oil-paint.

If the compound made according to the formula given, without the addition of coloring material, be applied to brick walls, the color of the brick and mortar remain the same as before its application.

I contemplate applying my paint to wood or other surfaces, either with or without coloring material.

I claim as an improved article of manufacture—

A paint compound, composed of the ingredients specified, in the proportions herein set forth.

The foregoing specification of my improved paint signed by me this 10th day of January, 1870.

EZRA BLAKELEY.

Witnesses:
 JOS. S. WILLIAMS,
 DAVID ROBINSON.